(12) United States Patent
Youn

(10) Patent No.: US 8,959,324 B2
(45) Date of Patent: Feb. 17, 2015

(54) DUAL OS SYSTEM USING A SMART SIM MODULE AND CONTROLLING METHOD THEREOF

(75) Inventor: Jinsoo Youn, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 712 days.

(21) Appl. No.: 12/986,175

(22) Filed: Jan. 7, 2011

(65) Prior Publication Data

US 2011/0312383 A1 Dec. 22, 2011

(30) Foreign Application Priority Data

Jun. 21, 2010 (KR) .................. 10-2010-0058477

(51) Int. Cl.
*G06F 15/177* (2006.01)
*G06F 9/44* (2006.01)

(52) U.S. Cl.
CPC .................................... *G06F 9/441* (2013.01)
USPC ............................................. 713/2; 455/558

(58) Field of Classification Search
CPC ....... G06F 9/441; G06F 15/177; H04W 4/003
See application file for complete search history.

(56) References Cited

U.S. PATENT DOCUMENTS

| | | | |
|---|---|---|---|
| 2003/0228866 A1* | 12/2003 | Pezeshki | 455/422.1 |
| 2006/0183505 A1* | 8/2006 | Willrich | 455/566 |
| 2008/0162914 A1* | 7/2008 | Adrangi et al. | 713/2 |
| 2009/0305737 A1* | 12/2009 | Bae et al. | 455/552.1 |
| 2010/0093396 A1* | 4/2010 | Roundtree | 455/558 |
| 2010/0132042 A1* | 5/2010 | Zhang | 726/24 |
| 2011/0105081 A1* | 5/2011 | Park et al. | 455/411 |

FOREIGN PATENT DOCUMENTS

WO 03/083694 10/2003

OTHER PUBLICATIONS

Vlad Savov: "SK Telecom's Android SIM prototype combines CPU, storage and OS into one (video)", AOL Inc. Feb. 17, 2010, XP002640369, Retrieved from the Internet: URL: http://www.engadget.com/2010/02/17/sktelecoms-androide-sim-prototype-combines-cpu-storage-and-os/[retrieved on Jun. 10, 2011].

(Continued)

*Primary Examiner* — Melanie Jagannathan
*Assistant Examiner* — Jason Harley
(74) *Attorney, Agent, or Firm* — Morgan, Lewis & Bockius LLP

(57) ABSTRACT

A computer system, and more particularly, to a system and controlling method thereof are disclosed, by which a plurality of operating systems can be driven using a smart subscriber authentication module. The present invention includes at least one display unit, a first memory provided with a first operating system, a subscriber identification module (SIM) including a second memory provided with a second operating system different from the first operating system and a second controller configured to perform an operation for the second operating system, and a first controller determining whether the subscriber identification module is connected via a prescribed interface, the first controller, if determining that the subscriber identification module is connected, controlling a booting of the first operating system or a booting of the second operating system through the operation by the second controller to be selectively executed on the at least one display unit.

8 Claims, 9 Drawing Sheets

(56) References Cited

OTHER PUBLICATIONS

"SK Telecom's Android SIM prototype combines CPU, storage and OS into one", Internet Citation, Feb. 16, 2010, pp. 1-1, XP008137708, Retrieved from the Internet: URL: http://www.youtube.com/watch?v=rrQz9xMeyRY&feature=player_embedded [retrieved on Jun. 8, 2011] (3) WO2003-083694.

European Search Report for EP 11 00 0056.

\* cited by examiner (a)

(b)

DUAL OS SYSTEM USING A SMART SIM MODULE AND CONTROLLING METHOD THEREOF

Pursuant to 35 U.S.C. §119(a), this application claims the benefit of earlier filing date and right of priority to Korean Application No. 10-2010-0058477, filed on Jun. 21, 2010, the contents of which are hereby incorporated by reference herein in their entirety.

BACKGROUND OF THE INVENTION

1. Field of the Invention

The present invention relates to a computer system, and more particularly, to a system and controlling method thereof. Although the present invention is suitable for a wide scope of applications, it is particularly suitable for driving a plurality of operating systems using a smart subscriber authentication module.

2. Discussion of the Related Art

Generally, a subscriber identification module (hereinafter abbreviated SIM) card is an IC card configured to implement a subscriber identification module and becomes an essential element of a mobile terminal according to the GSM standard. Similarly, a universal subscriber identification module (hereinafter abbreviated USIM) card is an extension of the GSM standard SIM and is used for a third generation mobile communication (3G/4G) terminal.

The SIM/USIM card is normally loaded in a slot within a backside cover of a mobile terminal. Since subscriber information is stored in an internal memory of the SIM/USIM card, a user is able to use any terminal using the SIM/USIM card. As user authentication is completed, a billing and payment can be handled irrespective of a terminal. As the SIM/USIM card has excellent security, it can be efficiently used for e-commerce and the like.

We are in a time of transition from the second generation communication (e.g., 2F/CDMA) to the third generation communication (e.g., 3G/4G). As the third generation communications are globally supplied, the demand for the SIM/USIM card is increasing.

The card having the above-mentioned subscriber identification module is provided with a larger scale storage means and also includes a non-volatile memory semiconductor device capable of an operation function with relatively low power consumption. So, such a card can be called a smart subscriber identification module (hereinafter abbreviated a smart SIM) card. Therefore, there are ongoing demands for a system and controlling method thereof to diversely utilize the functions of various semiconductor devices provided to the smart SIM card.

SUMMARY OF THE INVENTION

Accordingly, the present invention is directed to a computer system that substantially obviates one or more problems due to limitations and disadvantages of the related art.

An object of the present invention is to provide a system and controlling method thereof, by which convenient functions can be provided through a storage medium and processor of a smart subscriber identification module card.

Another object of the present invention is to provide a system and controlling method thereof, by which at least two operating systems can be simultaneously driven through a storage medium and processor of a smart subscriber identification module card.

A further object of the present invention is to provide a system and controlling method thereof, by which at least two executed screens of different operating systems can be simultaneously displayed using at least two display devices, respectively.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a computer system according to the present invention includes at least one display unit, a first memory provided with a first operating system, a subscriber identification module (SIM) including a second memory provided with a second operating system different from the first operating system and a second controller configured to perform an operation for the second operating system, and a first controller determining whether the subscriber identification module is connected via a prescribed interface, the first controller, if determining that the subscriber identification module is connected, controlling a booting of the first operating system or a booting of the second operating system through the operation by the second controller to be selectively executed on the at least one display unit.

In another aspect of the present invention, a method of controlling a system, which includes a first operating system and a first controller, includes the steps of recognizing a subscriber identification module including a second operating system and a second controller, if the subscriber identification module is recognized as a result of the recognizing step, selecting a booting of the first operating system via an operation of the first controller or a booting of the second operating system via an operation of the second controller, and performing the booting of the corresponding operating system according to a result of the selecting step.

Accordingly, the present invention provides the following effects and/or advantages.

First of all, a system according to at least one embodiment of the present invention is able to simultaneously drive at least two operating systems through a storage medium and processor of a smart subscriber identification module card.

Secondly, the present invention is able to implement a data communication function via a mobile communication network using a storage medium of a smart subscriber identification module card.

Thirdly, the present invention is able to simultaneously display a plurality of operation system executed screens on a plurality of display units, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts. As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

In this disclosure, a computer system includes one of a smart phone, a laptop computer, a digital broadcast terminal, a PDA (personal digital assistants), a PMP (portable multimedia player), a navigation system, a digital TV set, a desktop computer and the like.

Computer System Structure

Figure 1A:
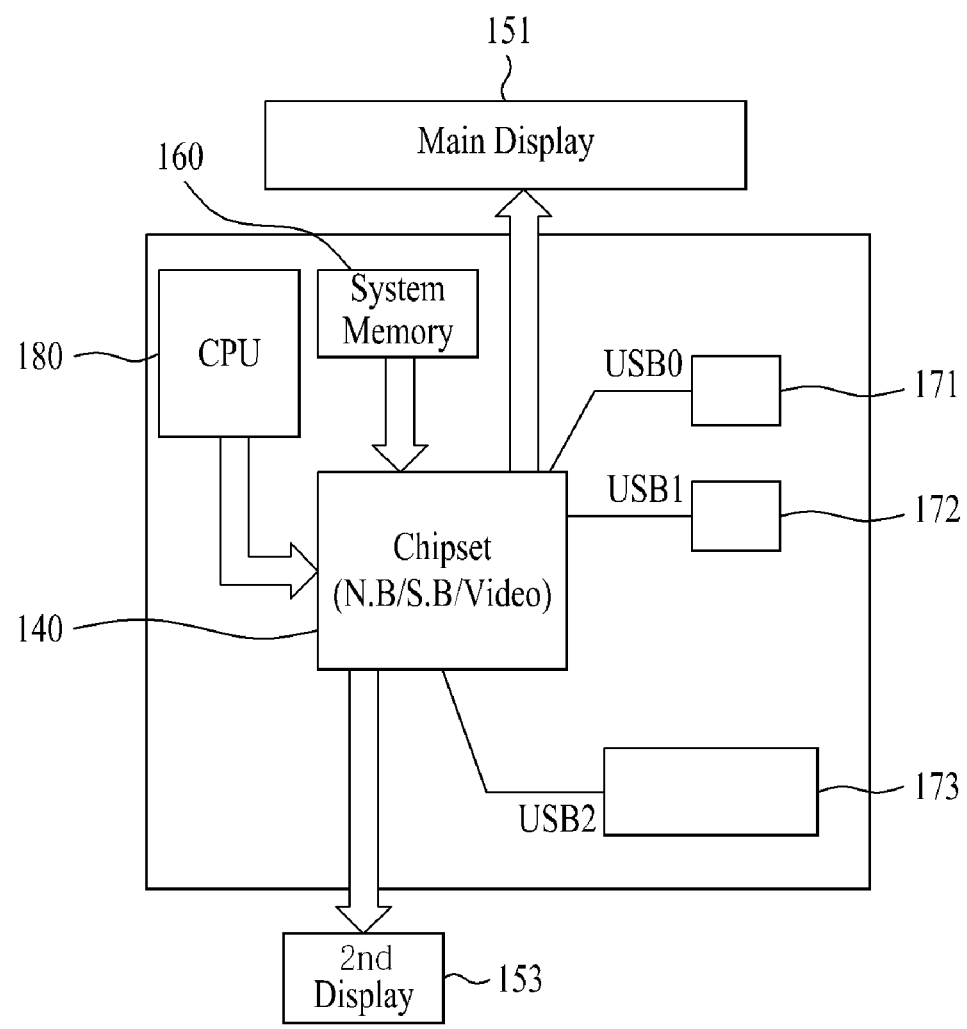
FIG. 1A is a block diagram of a system for one example of a computer system structure for implementing embodiments of the present invention.

FIG. 1A is a block diagram of a system for one example of a computer system structure for implementing embodiments of the present invention.

Referring to FIG. 1A, a computer system according to the present invention can include a main chipset 140, a main display unit 151, a secondary display unit 153, a system memory unit 160, first to third interface modules 171 to 173, a central processing unit (CPU) 180 and the like. Since the components shown in FIG. 1A are not mandatory, the computer system can be implements with more or less components. For instance, such an input device for a user's command input as a keyboard, a mouse, a touch sensor, a microphone, a camera and the like, such an output device as a speaker, a printer and the like, a power supply device and the like can be further provided or connected to the computer system.

In the following description, the above-mentioned components are explained in turn.

First of al, the main chipset 140 plays roles similar to those of a chipset provided to a main board of a general computer system. In particular, the main chipset 140 may mean a controller chip that is a core component for connecting and controlling the respective components. Generally, the main chipset indicates a north bridge (NB) for controlling a memory and graphics and a south bridge (SB) for controlling such a peripheral device as an interface and the like. The bridges are implemented with individual devices, respectively, or can be implemented with a single module. In this case, the north bridge is able to play a role in controlling a separately provided graphic processing unit (GPU) or a graphic card including the same. Yet, in this disclosure, the north bridge is regarded as responsible for overall controls related to graphics irrespective of a presence or non-presence of the graphic card.

The main display unit 151 displays or outputs information processed by the computer system. For instance, the main display unit 151 displays a graphic processing result of the processor 180 for an executed operating system or application or a UI (user interface) or a GUI (graphic user interface) under the control of the main chipset 140.

The display unit can include at least one of a liquid crystal display (LCD), a thin film transistor liquid crystal display (TFT LCD), an organic light emitting diode (OLED) display, a flexible display, a 3D display and the like.

According to an implementation type of the computer system, at least one secondary display unit 153 can exist in addition to the main display unit 151. For instance, a plurality of display units can be provided to the main body of the computer system in a manner of being spaced apart or built in one body on a single face. Alternatively, a plurality of the display units can be provided to different faces of the main body of the computer system, respectively. For another instance, at least two separate display devices can be provided in a manner of being connected by wire/wireless.

In case that the display unit 151 or 153 and a sensor for detecting a touch action (hereinafter called 'touch sensor') configures a mutual layer structure (hereinafter called 'touchscreen'), it is able to use the display unit 151 or 153 as an input device as well as an output device. In this case, the touch sensor can be configured as a touch film, a touch sheet, a touchpad or the like.

The touch sensor can be configured to convert a pressure applied to a specific portion of the display unit or a variation of a capacitance generated from a specific portion of the display unit to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the CPU 180. Therefore, the controller 180 is able to know whether a prescribed portion of the display unit 151 or 153 is touched.

The memory unit 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the computer system according to the present invention is able to operate in association with a web storage for performing a storage function of the memory unit 160 on Internet. Assume that at least one operating system is installed in the memory unit 160 of the present invention.

Each of the first to third interface modules 171 to 173 is often implemented to couple the computer system according to the present invention with built-in or external devices. The interface module is able to transmit/receive data in a manner of being connected to the main chipset 140 via such an interface as a universal serial bus (USB) and the like. The interface module can include one of a wired/wireless headset, an external charger, a USB storage medium, a smart SIM, an SIM, a USIM, a modem qualified for one of various radio interface standards and the lie.

The central processing unit (CPU) 180 control overall operations of the computer system in general.

For clarity, in the following description, the central processing unit 180 and the main chipset 140 are combined together and are then called a controller.

The computer system according to the present invention may also include user input unit 130 (not shown). The user input unit generates input data responsive to user manipulation of an associated input device or devices. Examples of such devices include a keypad, a dome switch, a touchpad (e.g., static pressure/capacitance), a jog wheel, a jog switch, etc.

For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180 itself.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory unit 160, and executed by a controller or processor, such as the controller 180.

Figure 1B:
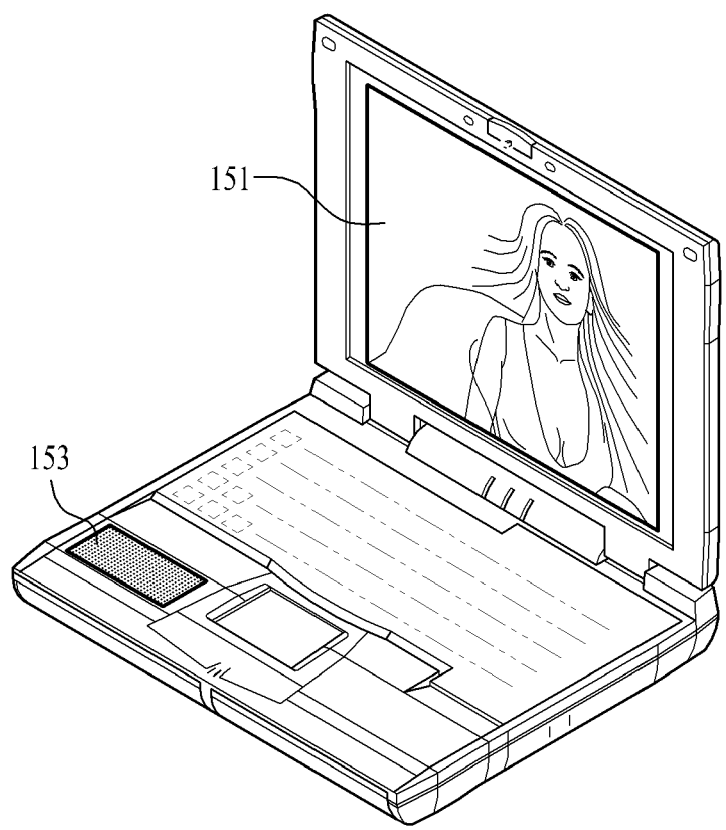
FIG. 1B is a perspective diagram of a laptop type system for implementing embodiments of the present invention, in which two display units are provided to the system.

FIG. 1B is a perspective diagram of a laptop type system for implementing embodiments of the present invention, in which two display units are provided to the system.

Referring to FIG. 1B, in case that the computer system according to the present invention is implemented into a laptop or notebook computer type, the secondary display unit 153 can be provided smaller than the main display unit 151 to one face of a notebook computer in the vicinity of such an input device as a keyboard.

The installed location of the secondary display unit and the type of the computer system shown in FIG. 1B are just exemplary, by which the present invention is non-limited. Alternatively, the type of the computer system can include one of various types such as a tablet PC, a desktop PC, a PMP and the like. Moreover, the secondary display unit can be implemented with a display device provided separate from the computer system body.

Structure of Smart SIM Card

As mentioned in the foregoing description, a memory device of a relatively high capacity (e.g., 1 gigabytes or more) can be provided to a subscriber identification module recently and such a processor suitable for a mobile device as AMR9 is loaded on the subscriber identification module, whereby a smart SIM card can be configured. Structure of the smart SIM card is explained with reference to FIG. 2 as follows.

Figure 2:
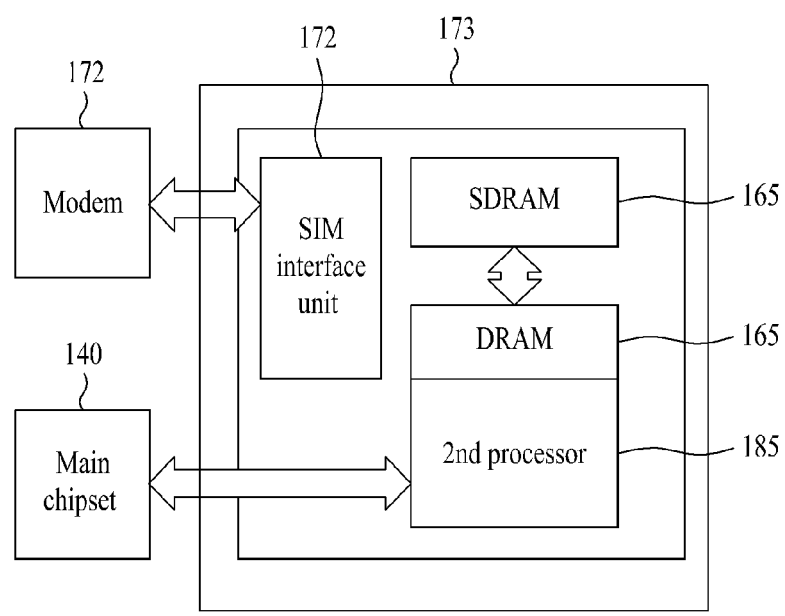
FIG. 2 is a block diagram for one example of a smart SIM card structure for implementing embodiments of the present invention.

FIG. 2 is a block diagram for one example of a smart SIM card structure for implementing embodiments of the present invention.

Referring to FIG. 2, a smart SIM card according to the present invention is assumed as connected as a third interface module 173 to a computer system. The smart SIM card 173 is loaded with such a second processor (or a second CPU) 185 suitable for a low-power consumption mobile device as ARMS and is able to include such a memory device 165 as DRAM, SDRAM and the like. Information on a subscriber can be stored in the memory device 165. And, an operating system (OS) identical to or different from another operating system installed at the memory unit 160 of the computer system can be installed or stored in the memory device 165. In this case, the OS installed or stored in the memory device 165 is preferably driven by the operation through the second CPU and preferably has a type different from that installed in the memory unit 160. More preferably, the OS installed in the memory device 165 can include such a mobile based operating system as Linux, Android, Windows Mobile (WM) and the like instead of a general operating system installed at a computer system. Moreover, the memory device 165 can further include a driver for driving a mobile communication modem provided to a computer system to be connected.

In this case, the smart SIM card 173 can be connected to a main frame of the computer system, e.g., a second interface module 172, via an SIM interface unit 175. In this case, if the second interface module 172 includes a mobile communication modem (e.g., a modem for 3G/4F specification, a modem operative in Linux, etc.), data communications via a mobile communication network can be implemented in a manner that the second processor 185 controls the mobile communication modem 172 by driving the OS installed in the memory device 165.

The second processor 185 is connected to the main chipset 140 and is then able to deliver display information and the like to the main chipset 140. The main chipset 140 enables the result of the operation performed by the second processor 185 to be displayed on the main display unit 151 or the secondary display unit 153 using the display information delivered by the second processor 185. In this case, the second processor 185 can be named a control unit of a user authentication module.

Meanwhile, a general SIM/USIM card is connected to a computer system or a mobile terminal by 6PIN. Yet, the smart SIM card can be connected to a computer system using total 8PIN terminals by adding 2PIN of USB 2.0 specification to the conventional 6PIN terminals. Since the USB 2.0 specification is recognizable by a BIOS terminal of a computer system, it can be recognized without booting the OS installed in the memory unit 160.

Connection Between Smart SIM Card & Computer System

In the following description, the combination of the above mentioned computer system and smart SIM card is explained with reference to FIG. 3A and FIG. 3B.

Figure 3A:
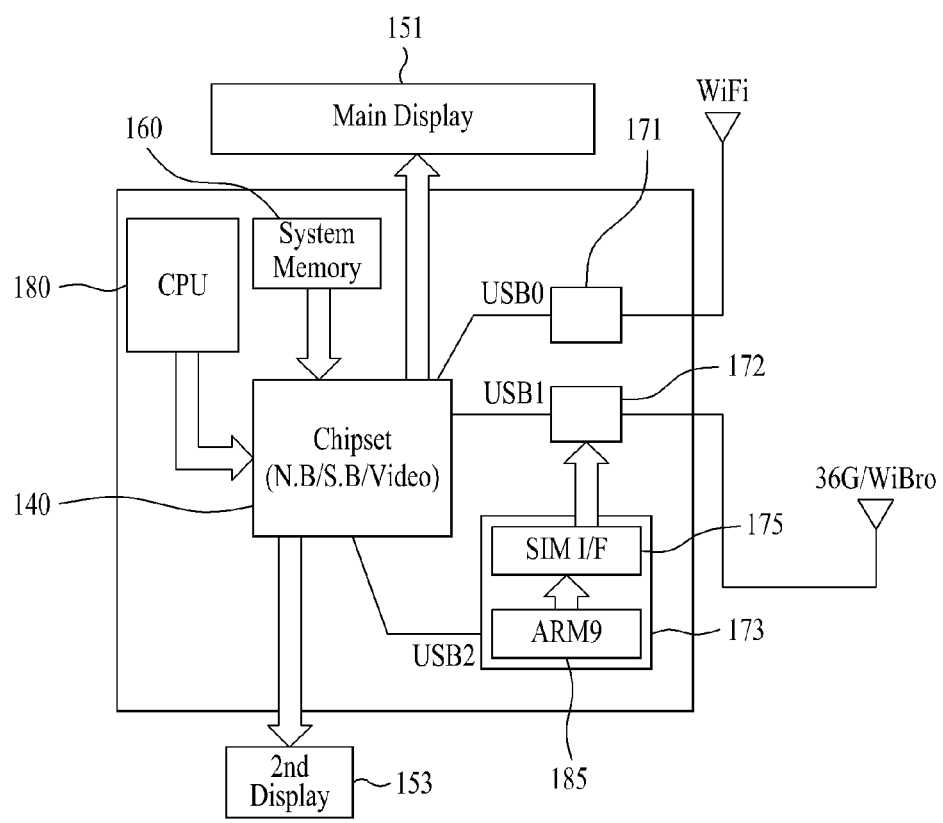
FIG. 3A is a block diagram of a system for one example of connecting a smart SIM card to a system having two display units according to the present invention.

FIG. 3A is a block diagram of a system for one example of connecting a smart SIM card to a system having two display units according to the present invention.

Referring to FIG. 3A, assume a situation that the smart SIM described with reference to FIG. 2 is connected to the third interface module 173 of the computer system described with reference to FIG. 1A.

Assuming that a modem qualified for the wireless LAN (Wi-Fi)/LAN specification and a modem for communicating with a mobile communication network (3G/4G) are provided to the first interface module 171 and the second interface module 172, respectively, each of the interface modules is connectible to the main chipset 140 via a USB interface. In this case, the smart SIM 173 can be connected to the modem 172 for communicating with the mobile communication network via a SIM interface 175. In this case, the second processor 185 can control the modem 172.

The main chipset 140 is able to control an output signal delivered from the second processor 185 to be selectively outputted via at least one of the main display unit 151 and the secondary display unit 153. In some cases, the main chipset 140 is able to control an output signal of the OS driven through the CPU 180 by being installed in the memory unit 160 and an output signal of the OS driven via the second processor 185 by being installed in the memory device 165 to be outputted to the same display unit. Alternatively, the main chipset 140 is able to control an output signal of the OS driven through the CPU 180 by being installed in the memory unit 160 and an output signal of the OS driven via the second processor 185 by being installed in the memory device 165 to be outputted to the different display units, respectively.

The CPU 180 of the computer system controls the mobile communication modem 172 by emulating the function of the mobile communication terminal using the subscriber information contained in the memory device 165 built in the smart SIM and is then able to use the mobile communication network or play back the mobile contents contained in the corresponding device 165.

Meanwhile, the secondary display unit 153 can be omitted if necessary. One example of a system structure corresponding to such a case is shown in FIG. 3B.

Figure 3B:
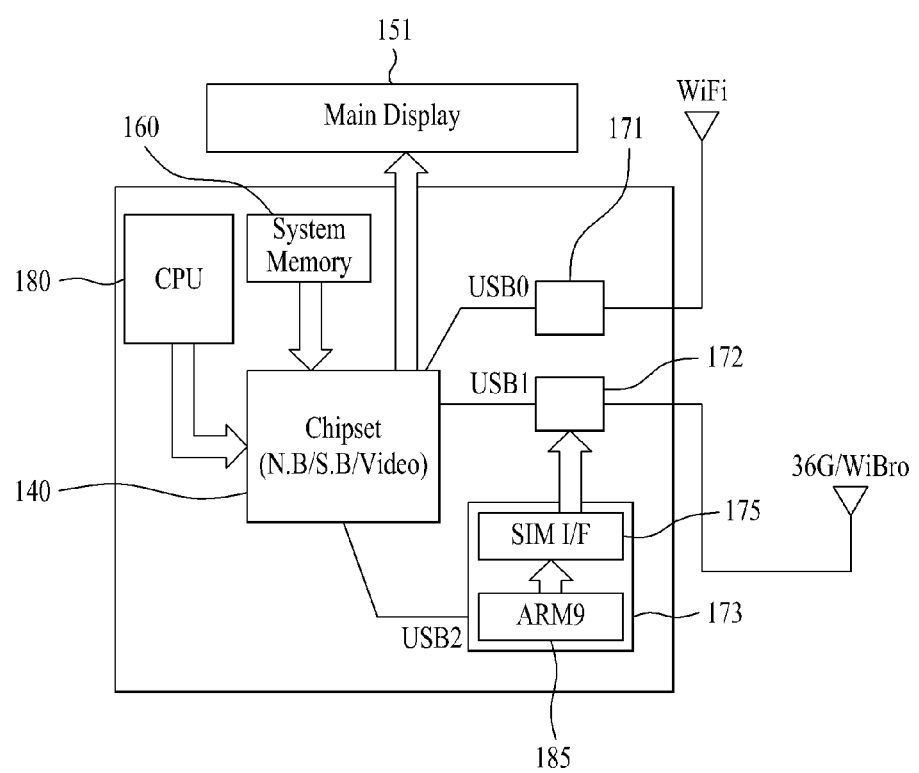
FIG. 3B is a block diagram of a system for one example of connecting a smart SIM card to a system having a single display unit according to the present invention.

FIG. 3B is a block diagram of a system for one example of connecting a smart SIM card to a system having a single display unit according to the present invention.

The system shown in FIG. 3B has a configuration similar to that of the former system shown in FIG. 3A overall but differs from the former system in including the main display unit 151 only by omitting the secondary display unit 153. In this case, the main chipset 140 controls an output signal of the OS driven through the CPU 180 by being installed in the memory unit 160 or an output signal of the OS driven via the second processor 185 by being installed in the memory device 165 to be selectively displayed on the main display unit 151. Alternatively, the main chipset 140 partitions the main display unit 151 into prescribed regions and then allocates the output signals to the prescribed regions, respectively.

In the following description, a controlling method for driving multiple operating system using the computer system and smart SIM card described with reference to FIGS. 1 to 3 and a controlling method for using a radio interface are explained. In the following embodiments, assume that the x86 based OS, i.e., the Windows Series (e.g., Win ME, XP, Vista, 7, etc.) is installed in the system memory 160. And, assume that a mobile based OS (e.g., Linux, Android, etc.) is installed in the memory unit 165 of the smart SIM card.

Case of Having Single Display Unit

Figure 4:
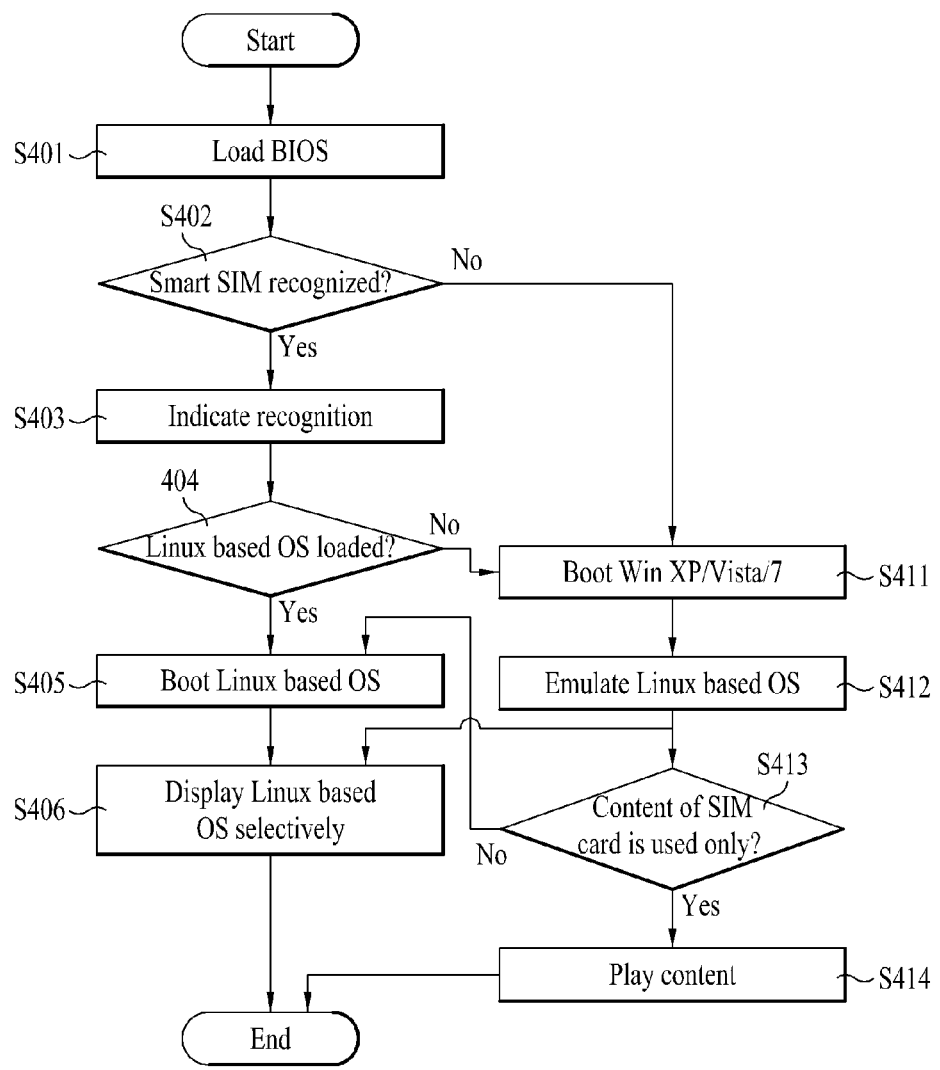
FIG. 4 is a flowchart for one example of an operating system selection and a function execution sequence according to the selected operating system in a system having a single display unit according to the present invention.

In the following description, explained with reference to FIG. 4 is a case that a system according to the present invention includes a single display unit.

FIG. 4 is a flowchart for one example of an operating system selection and a function execution sequence according to the selected operating system in a system having a single display unit according to the present invention.

Referring to FIG. 4, if a power is applied to a computer system according to the present invention or a user manipulates a main switch of the computer system, the computer system is activated and BIOS is loaded by the controller [S401].

In this case, in a broad sense, the BIOS (basic input/output system) indicates a program responsible for input/output from/out hardware on a lowest level among programs loaded in a computer system. In a narrow sense, the BIOS can indicate a program loaded in IBM-PC (x86) compatible model. The BIOS is a sort of firmware positioned between hardware and software in computer. In the BIOS, software mostly controls hardware and information changed or generated by the hardware is delivered to and processed by the software. Thus, the BIOS plays a role as a human nerve network. Meanwhile, the BIOS can be provided to the memory unit 160.

As mentioned in the foregoing description, the smart SIM is connected via an interface of the USB 2.0 specification or higher version. Since the BIOS stage supports recognition in the USB 2.o specification, the controller is able to determine whether the smart SIM is connected in the BIOS loaded state [S402].

If the smart SIM is recognized, a user can be informed that the smart SIM is recognized using a prescribed visual effect displayed on the main display unit 151 [S403]. For instance, the prescribed visual effect can include at least one of a smart SIM logo, a message window and the like.

Subsequently, the controller reads the memory 165 of the recognized smart SIM and is then able to determine whether the OS is installed in the memory 165 [S404].

If the OS is installed in the smart SIM, the mobile based OS (e.g., Linux, android, etc.) can be booted by an operation of the second processor 185 of the smart SIM according to a user's selection [S405].

In this case, the user's selection can be performed in the following manner. First of all, after completion of the BIOS loading and the recognition of the mobile based OS installed smart SIM, a selection window or menu of a prescribed type for selecting the general OS or the mobile based OS is displayed on the display unit 151. Secondly, a user performs an input using such a user command device as a keyboard, a mouse and the like. On the contrary, in case that the mobile based OS installed smart SIM is recognized, it is able to previously set the BIOS to perform the booting via the smart SIM automatically.

In case of booting the mobile based OS, the mobile communication modem 172 is controlled by the second processor 185 to perform the mobile communication based data communications. And, display information on the corresponding OS can be displayed on the main display unit 151 via the main chipset 140 [S406].

In doing so, in order to control the mobile communication modem 172, a driver for the modem 172, which is stored in the memory 165 built in the smart SIM, can be loaded.

In case that the secondary display unit 153 is provided, an OS executed screen of the mobile based OS can be selectively displayed on the main display unit 151 and/or the secondary display unit 153 according to a user's selection.

If the smart SIM is not recognizable or the OS is not loaded in the smart SIM in the step S402, the OS (window based) installed in the system memory unit 160 is loaded to initiate the corresponding booting [S411].

In this case, it is able to implement the data communications via the mobile communication modem or the mobile contents stored in the memory unit 165 of the smart SIM. For this, the system memory unit 160 is able to use an application for emulating a mobile communication terminal operating in the Windows Series OS. In particular, a configuration of the mobile communication terminal is implemented by executing the emulation application using the computer system and the system CPU 180 controls the mobile communication modem 172 using the subscriber information stored in the smart SIM to perform the data communications via the mobile communication network through the authentication via the mobile communication network. If so, it brings the effect similar to the mobile based OS loading [S406]. Even if the data communication is not used, the mobile content stored in the smart SIM is read and played back [S413, S414].

The above-described emulation application is explained with reference to FIG. 5 as follows.

Figure 5:
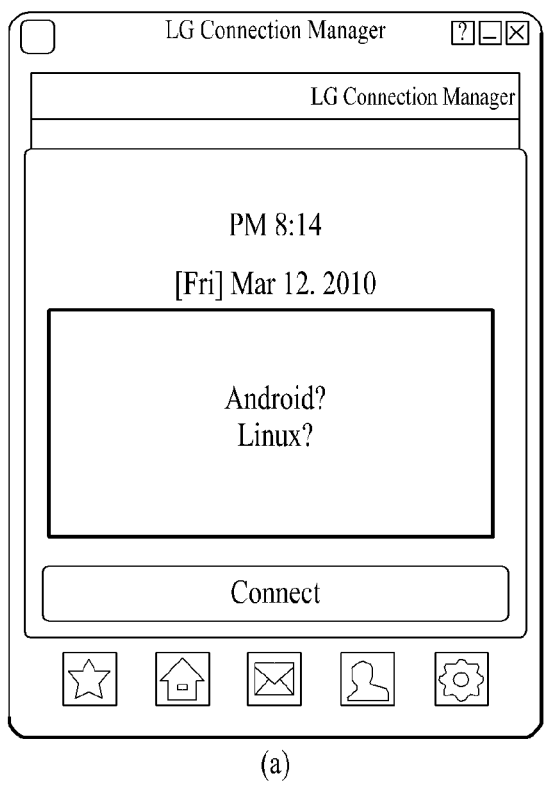
FIG. 5 is a diagram of display screen configurations for one example of displaying an operating system emulation application using an identity module of a smart SIM card in a system according to one embodiment of the present invention.
Figure 5:
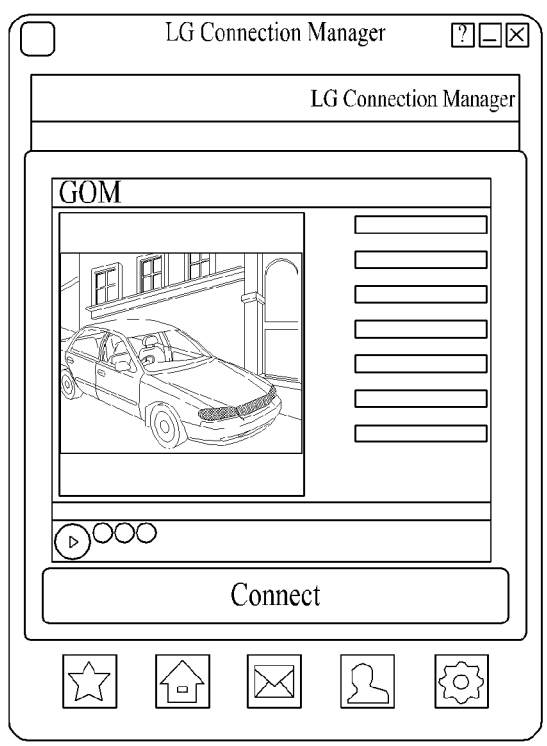

FIG. 5 is a diagram of display screen configurations for one example of displaying an operating system emulation application using an identity module of a smart SIM card in a system according to one embodiment of the present invention.

Referring to FIG. 5 (*a*), the emulation application installed in the system memory unit 160 is operative on the OS loaded in the system memory 160. The emulation application is displayed as a window of a predetermined size on the main display unit 151 or can be displayed on a whole screen of the main display unit 151. Once the application is executed, it is able to select a type of the mobile OS to be initially emulated.

Once the type of the mobile OS is selected, referring to FIG. 5 (*b*), a user interface similar to driving the corresponding mobile OS is provided on a mobile terminal. Through this user interface, a user is able to perform such a management operation as 'play', 'edit', 'delete' and the like on a mobile content stored in the smart SIM. In doing so, the emulation application is able to perform a function of converting a file format suitable for each OS to a format recognizable by a counterpart OS. In this case, in an area having a faster speed of a mobile communication network, a mobile content corresponding to a user-specific window content is downloaded via the mobile communication network accessed by the mobile OS, the downloaded content is converted to a window recognizable file, and the corresponding content can be then played back on the window.

Cases of Having Plural Display Units

Figure 6:
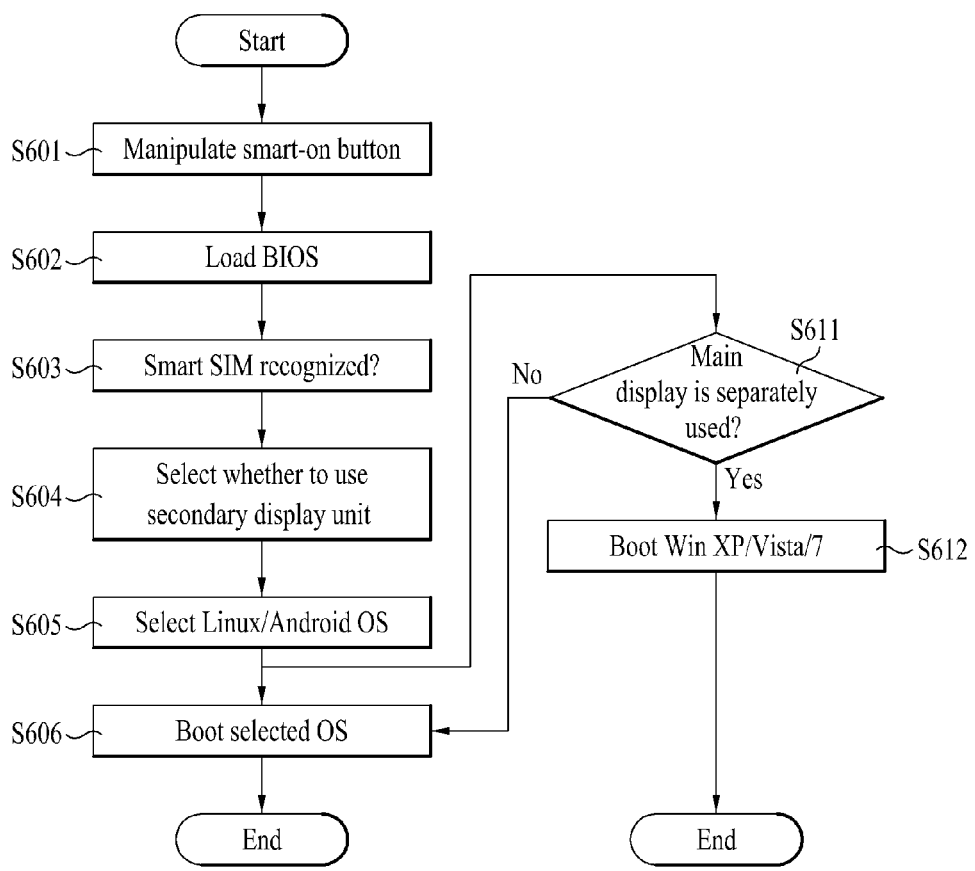
FIG. 6 is a flowchart for one example of an operating system selection and a function execution sequence according to the selected operating system in a system having two display units according to the present invention.

In the following description, explained with reference to FIG. 6 is a case that a system according to the present invention includes a plurality of display units. In case that the system includes a plurality of the display units, the same assumptions applied to the aforesaid emulation application are applicable thereto.

FIG. 6 is a flowchart for one example of an operating system selection and a function execution sequence according to the selected operating system in a system having two display units according to the present invention.

First of all, a method of initiate to boot an OS loaded in the system memory 160 is similar to the steps S401 to S411 shown in FIG. 4 and the redundant description shall be omitted from the following description for clarity. In FIG. 6, assume that the booting is initiated using the mobile based OS loaded in the smart SIM.

Referring to FIG. 6, as a power is applied to a computer system according to the present invention or a user turns on a main switch, the computer system is activated. And, the BIOS can be loaded by the controller. Yet, in FIG. 6, a separate hardware switch (hereinafter named a smart-on button, for clarity) is provided to the system. In case that the corresponding switch is manipulated, the controller is able to control the booting to be directly initiated via the OS loaded in the smart SIM [S601].

Subsequently, the BIOS is loaded [S602] and the recognition of the smart SIM is initiated via a USB interface in the BIOS stage [S603].

The above mentioned steps are displayed on the main display unit 151. In case that the booting is initiated through the smart-on button according to a setting, the above mentioned steps are displayed on both of the main display unit 151 and the secondary display unit 153 or can be displayed on either the main display unit 151 or the secondary display unit 153 [S604].

Afterwards, if the mobile OS loaded in the smart SIM is selected [S605], the booting via the selected OS is performed [S606]. Preferably, this booting process can be performed by an operation by the second processor 185 built in the smart SIM.

Once the booting of the mobile based OS is completed, the mobile communication modem 172 is controller by the second processor 185 to execute the mobile communication based data communications. And, display information on the corresponding OS can be selectively displayed on the main display unit 151 or the secondary display unit 153 via the main chipset 140.

In this case, according to a user's selection (e.g., a manipulation of a hardware key button provided to the system), the main display unit 151 is available for displaying the OS loaded in the system memory unit 160 [S611].

If so, the system CPU 180 is activated, the booting via the OS (Windows series) loaded in the system memory unit 160 is executed, and the corresponding information can be then displayed on the main display unit 151 [S612].

Through this, a user is able to simultaneously use both of the system OS displayed on the main display unit 151 and the mobile based OS displayed on the secondary display unit 153. Of course, the user is able to simultaneously perform both a data exchange using the LAN/Wi-Fi modem 171 controlled via the system OS and a data exchange using the mobile communication modem 172 controlled via the mobile OS. In particular, the user is able to drive different operating systems via different CPUs, respectively, using a single system having the smart SIM connected thereto. And, the user is able to simultaneously perform data communications via different radio interfaces by controlling modems of different types.

Meanwhile, in case that the mobile OS displayed on the secondary display unit 153 is terminated, the user reboots the mobile OS using the second processor of the smart SIM or is able to activate the mobile communication modem 172 via the emulation application like the former steps S412 to S414 shown in FIG. 4.

According to the above described embodiment, each of the display units displays a different OS. Yet, although at least two display units are provided, one of the at least two display units is activated only to enable operating screens of two operating systems to be simultaneously displayed on the activated display unit. For instance, in case that the main display unit 151 is used only, the system OS is displayed on a whole screen of the main display unit 151 and a mobile OS executed screen can be displayed as a window on a partial region of the whole screen of the main display unit 151.

Multiple Operating Systems in Aspect of Internet Access

In the following description, the above described embodiments of the present invention are explained in aspect of a method of accessing Internet or a communication network corresponding to Internet.

Figure 7:
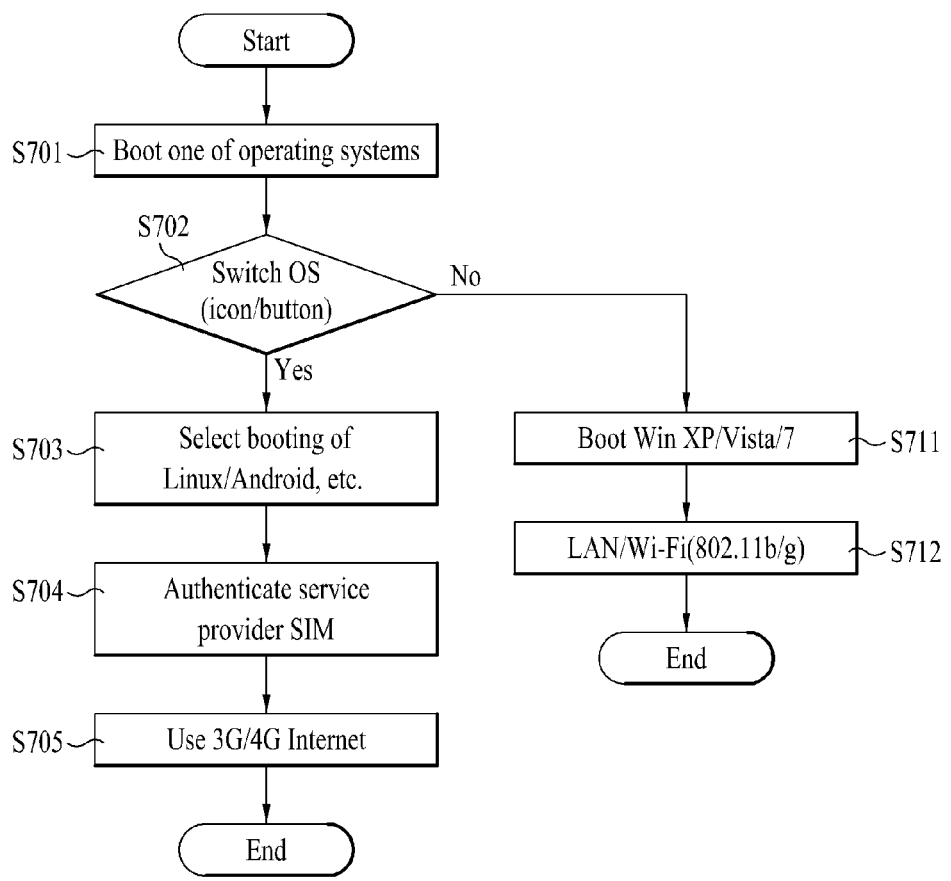
FIG. 7 is a flowchart for one example of a method of performing communications using different radio interfaces by simultaneously driving two operating systems in a system having two display units according to the present invention.

FIG. 7 is a flowchart for one example of a method of performing communications using different radio interfaces by simultaneously driving two operating systems in a system having two display units according to the present invention.

Referring to FIG. 7, if either the system OS or the mobile OS is selected via the steps S401 to S404 shown in FIG. 4, the steps S401 to S411 shown in FIG. 4, or the steps S601 to S605 shown in FIG. 6, a booting can be performed [S701].

Irrespective of whether the booting is executed first via the system OS or the mobile OS, if an icon/menu provided to an application operating in the corresponding OS or a hardware button provided to a system is manipulated, a different OS can be selected via the same display unit or a different display unit [S702].

In case that the selected OS is the mobile OS, the booting of the mobile OS loaded in the smart SIM memory 165 is initiated using the second processor 185 of the smart SIM [S703].

Once the booting is completed, as the mobile communication (or Linux) modem driver stored in the smart SIM memory is loaded, the second processor 185 is able to control the mobile communication modem 172 via the interface module 175. Accordingly, user authentication can be performed in a manner of accessing a mobile communication network via the subscriber information stored in the smart SIM memory [S704].

As the authentication procedure is completed, a data exchange via the mobile communication network (3G/4G) can be performed using the mobile communication modem 172 [S705].

If the selected OS is the OS loaded in the system, the booting is performed through the corresponding OS [S711].

Therefore, a general Internet access via window-base operative LAN/Wi-Fi or the like is possible [S712].

Yet, even if the selected OS is the OS loaded in the system, as mentioned in the foregoing description, authentication is granted using the subscriber identification information through the emulation application and the data exchange via the mobile communication network can be then performed using the mobile communication modem 172.

Through the above described method, a user is able to use the system OS displayed on the main display unit 151 and the mobile based OS displayed on the secondary display unit 153 simultaneously or selectively. Accordingly, the user is able to simultaneously perform both of the data exchange using the LAN/Wi-Fi modem 171 controlled via the system OS and the data exchange using the mobile communication modem 172 controlled via the mobile OS. In particular, the user is able to derive different operating systems via different CPUs simultaneously or selectively using a single system having the smart SIM connected thereto. Accordingly, the data communications via different radio interfaces can be simultaneously or selectively performed by controlling modems of different types, respectively. Besides, the user is able to freely use data communication services of the mobile communication network by controlling the general Internet access via LAN/Wi-Fi in a general OS and the mobile communication network (3G/4G) modem via the emulation application according to a user's selection.

Therefore, it is advantageous for the user to selectively use difference communication interfaces according to a situation. For instance, if the user is in LAN/Wi-Fi unavailable area or Wi-Fi network is substantially unavailable due to a speed exceeding a terminal mobile speed supported by the Wi-Fi network (e.g., the user is within a transportation means moving relatively fast), the user may need to use Internet. In this case, the user is able to use data communications via the mobile communication network (3G/4G) by driving the mobile communication modem via the Windows-drivable emulation application or the mobile OS. Even if a fast Internet use is simply necessary, the fast booting via Chrome OS can save the time corresponding to the Windows booting time For another instance, since the data service via the 3G/4 G communication network costs a relatively high fee of use, if a user is located in LAN/Wi-Fi supported area, it is unnecessary to use the data service via the mobile communication network. In this case, the user performs the booting via Windows and then performs Internet access via LAN/Wi-Fi interface to save the communication fees. Moreover, in case of using a fixed amount service for a prescribed packet volume, it is able to save the fees for the remaining packets. For another instance, if both of the LAN/Wi-Fi and the mobile communication network are available for a user, the user is able to selectively use two kinds of communication interfaces. Therefore, a data download time can be saved using the different radio interfaces.

It will be apparent to those skilled in the art that various modifications and variations can be specified into other form(s) without departing from the spirit or scope of the inventions.

Meanwhile, according to one embodiment of the present invention, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). The above described computer system and controlling method thereof are not limitedly applicable to the mobile terminal including the display unit configured to display the above described stereoscopic image. To enable various modifications, the embodiments can be selectively combined together entirely or in part.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A computer system comprising:
   at least one display unit;
   a first memory storing a first operating system;
   a subscriber identification module (SIM) comprising:
      a second memory storing subscriber identification information and a second operating system different from the first operating system; and
      a second controller configured to perform an operation for the second operating system;
   a first controller controlling a booting of the first operating system or the second operating system through the operation by the second controller, a first modem connected via an interface to be driven by the first operating system; and a second modem connected via an interface to be driven by the second operating system;

wherein the display unit displays information identifying which operating system is being booted, wherein the first operating system comprises an x86-series operating system driven in a general computer system, wherein the second operating system comprises a Linux-series mobile operating system, wherein the second modem comprises a mobile communication modem, wherein the second operating system is installed in the SIM, a selection window for selecting the first operating system or the second operating system is displayed on the display unit, and the second operating system is booted by an operation of the second controller of the SIM when a user selects the second operating system to be booted, wherein the first operating system is automatically booted when the first controller determines that the SIM is not recognized or the second operating system is not loaded in the SIM, wherein the first controller controls the second modem to perform a data communication, extracts a mobile content stored in the SIM and converts a file format of the mobile content into a format recognizable by the first operating system when a user executes an application for emulating a mobile communication terminal operating in the first operating system.

2. The computer system of claim 1, wherein the first memory further comprises a BIOS, wherein the first controller determines whether the SIM is connected after the BIOS has been loaded, wherein the first controller controls a main chipset configured to control the at least one display unit, and wherein if the booting of the second operating system is executed, the second controller controls the main chipset to display an output image of the second operating system on the at least one display unit.

3. The computer system of claim 1, wherein the subscriber identification information stored in the second memory is for identifying a user in a mobile communication network and wherein the second controller controls an authentication procedure to be performed in the mobile communication network using the subscriber identification information for transceiving the data via the radio interface.

4. The computer system of claim 3, wherein the at least one display unit comprises:
a first display unit; and
a second display unit,
wherein the second controller controls the main chipset to selectively display the output image of the second operating system on at least one of the first display unit and the second display unit, and wherein the first controller further controls the first operating system to be booted according to a user's selection after the second operating system is booted.

5. A method of controlling a system, which includes a first operating system and a first controller, the method comprising:
recognizing a subscriber identification module (SIM) including a second operating system and a second controller;
displaying a selection window for selecting the first operating system or the second operating system, wherein the second operating system is installed in the SIM, when the SIM is recognized as a result of the recognition;
selecting a booting of the first operating system via an operation of the first controller or a booting of the second operating system via an operation of the second controller;
automatically booting the first operating system, wherein the first controller determines that the SIM is not recognized or the second operating system is not loaded in the SIM;
performing a data communication, extracting a mobile content stored in the SIM, and converting a file format into a format recognizable by the first operating system when a user executes an application for emulating a mobile communication terminal operating in the first operating system; and
displaying information identifying which operating system is being booted,
wherein a first modem is connected via the interface to be driven by the first operating system, wherein a second modem is connected via the interface to be driven by the second operating system, wherein the first operating system comprises an x86-series operating system driven in a general computer system, wherein the second operating system comprises a Linux-series mobile operating system, and wherein the second modem comprises a mobile communication modem.

6. The method of claim 5, wherein the first controller determines whether the SIM is connected after a BIOS has been loaded, wherein the first controller controls a main chipset configured to control the at least one display unit, wherein if the booting of the second operating system is executed, the second controller controls the main chipset to display an output image of the second operating system on the at least one display unit.

7. The method of claim 6, wherein the second controller controls an authentication procedure to be performed in the mobile communication network using the subscriber identification information for identifying a user in a mobile communication network for transceiving the data via the radio interface.

8. The method of claim 7, further comprising:
selectively displaying the output image of the second operating system on at least one of a first display unit and a second display unit; and
wherein the first controller further controls the first operating system to be booted according to a user's selection after the second operating system is executed.

* * * * *